United States Patent [19]

Inukai

[11] 4,270,709
[45] Jun. 2, 1981

[54] DEVICE FOR PREVENTING EXCESSIVE TIGHTNESS OF SEATBELTS

[75] Inventor: Mitsuo Inukai, Nagoya, Japan

[73] Assignee: Kabushiki Kaisha Tokai-Rika-Denki Seisakusho, Aichi, Japan

[21] Appl. No.: 725,874

[22] Filed: Sep. 23, 1976

[30] Foreign Application Priority Data

Sep. 29, 1975 [JP] Japan .................. 50-133031

[51] Int. Cl.³ ................. A62B 35/00; B65H 75/48
[52] U.S. Cl. ................................ 242/107.7
[58] Field of Search .......... 242/107.7, 107.6, 107.4 R, 242/107.4 E; 280/802-808; 297/475-480

[56] References Cited

U.S. PATENT DOCUMENTS

| 2,698,146 | 12/1954 | Becker | 242/107.7 |
|---|---|---|---|
| 3,384,108 | 5/1968 | Kern | 242/107.7 X |
| 3,490,715 | 1/1970 | Nicpon | 242/107.7 |
| 3,664,599 | 5/1972 | Partridge | 242/107.6 X |
| 3,834,646 | 9/1974 | Heath | 242/107.7 |
| 3,851,836 | 12/1974 | Sprecher | 242/107.7 |
| 3,869,098 | 3/1975 | Sprecher | 242/107.6 X |

Primary Examiner—John M. Jillions
Attorney, Agent, or Firm—Koda and Androlia

[57] ABSTRACT

A seatbelt retractor including a means for preventing excessive tightness of the seatbelt during use. The seatbelt retractor including a frame, a seatbelt take-up spool having a torque applied thereto in a wind-up direction and rotatably coupled to the frame, at least one ratchet gear coupled to the take-up spool, a pawl pivotally coupled to the frame and engageable with the ratchet gear such that the spool is prevented from winding up when the pawl engages with the ratchet gear, and means for disengaging the ratchet from the ratchet gear when the seatbelt is completely wound on the spool or so long as the seatbelt is being pulled out from the would up state and for engaging the ratchet with the ratchet gear when the seatbelt is being utilized.

5 Claims, 7 Drawing Figures

DEVICE FOR PREVENTING EXCESSIVE TIGHTNESS OF SEATBELTS

BACKGROUND OF THE INVENTION

1. Field of Invention

This invention relates to safety devices used in motor vehicles and the like and more particularly to seatbelt retractors.

2. Prior Art

With the advent of an awareness of vehicle safety and government regulation, a number of safety devices such as seatbelts have been provided in vehicles and particularly in automobiles. A typical prior art seatbelt for use in automobiles and the like is fastened at one end to a take-up spool having a torque in the wind-up direction of the belt applied to it. When the wearer places the seatbelt about his body, the wearer usually pulls out some extra length of seatbelt and after the buckle is coupled to the tongue plate, the excess seatbelt is automatically wound up by the aforementioned torque. Immediately thereafter, the wearer consciously or unconsciously adjusts the tension of the seatbelt by certain motions of his body such as, for example, bending the body slightly forward, or tensing the stomach muscles thus pulling the belt out a little. However, because the torque action on the take up spool tends to pull the belt in such that the tension gradually increases, an increased amount of discomfort is caused to the wearer. As a result of this discomfort, the wearer tends to discontinue use of the seatbelt and develop an aversion to wearing same. Such an aversion to the use of seatbelts is likely to increase the chance of injury to the non-wearer in an accident.

Accordingly, the present invention attempts to solve the shortcomings of the prior art discussed hereinabove.

SUMMARY OF THE INVENTION

It is the general object of the present invention to provide a mechanism for a seatbelt retractor which prevents the seatbelt from being pulled too tight on the wearer.

It is another object of the present invention to provide a mechanism for a seatbelt retractor which is simple and low in cost.

In keeping with the principles of the present invention, the objects are accomplished by a unique mechanism for a seatbelt retractor for preventing excessive tightness of the seatbelt during use including a retractor frame, a seatbelt take-up spool rotatably coupled to the frame and having a torque applied thereto in a wind-up direction, a seatbelt wound on the spool, at least one ratchet gear coupled to one end of the take-up spool, a pawl pivotally coupled to the frame and engagable with the ratchet gear such that the spool is prevented from winding up when the pawl engages with the ratchet gear and means for disengaging the pawl from the ratchet gear when the seatbelt is completely wound on the spool, so long as the seatbelt is being pulled out from the wound up state or the seatbelt is being wound up and for engaging the pawl with the ratchet gear when the seatbelt is being utilized.

BRIEF DESCRIPTION OF THE DRAWINGS

The above mentioned features and other objects of the present invention will become more apparent by reference to the following description taken in conjunction with the accompanying drawings, wherein like reference numerals denote like elements, and in which.

DETAILED DESCRIPTION OF THE INVENTION

Figure 1:
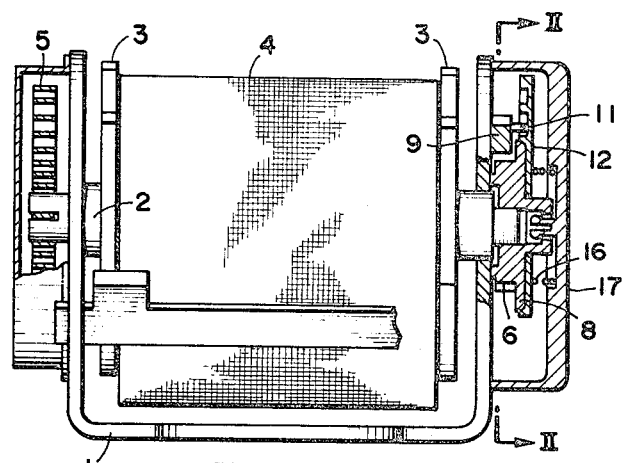
FIG. 1 is a partial plan view of the seatbelt retractor and mechanism for preventing excessive tightness in accordance with the teachings of the present invention.

Referring to FIG. 1, seatbelt retractor includes a U shaped retractor frame 1 having a pick-up spool 2 rotatably coupled thereto. Adjacent the ends of spool 2 are provided ratchet wheels 3 and one end of seatbelt 4 is secured to and wound around spool 2 between ratchet wheels 3. Coil spring 5 is provided on the outside of retractor frame 1 and the inner end of spring 5 is coupled to take-up spool 5 and the outer end of spring 5 is coupled to retractor frame 1. Spring 5 is provided to provide the torque in the winding up direction of the seatbelt 4.

At the opposite end from the spring 5 and outside the retractor frame 1 is provided a ratchet gear 6 fixed to one end of take-up spool 2. Each tooth of ratchet gear 6 has an engaging surface 7 facing the counter-clockwise direction or winding up direction of the seatbelt 4. A flange 8 projects laterally from the outside surface of ratchet gear 6. The pawl 9 is pivotally coupled to retractor frame 1 and provided adjacent ratchet gear 6 such that the end of pawl 9 can engage with engaging surface 7 of ratchet gear 6 thereby locking ratchet gear 6 and rendering the take-up spool 2 non-rotatable in the wind up direction.

A pin 11 for controlling the movement of pawl 9, which will be discussed later hereinbelow, projects outwardly from pawl 9 at about the midway point in the length of pawl 9. A cam plate 12 is fitted on to a hub on ratchet gear 6 and abuts against the outer surface of ratchet gear 6. Cam plate 12 frictionally engages with ratchet gear 6 and is pressed against ratchet gear 6 by the spring action of spring 16 which is provided between the inside surface of cam cover 17 and the outside surface of cam plate 12. As a result of the friction on engagement between cam plate 12 and ratchet gear 6, cam plate 12 rotates together with ratchet gear 6.

Figure 2:
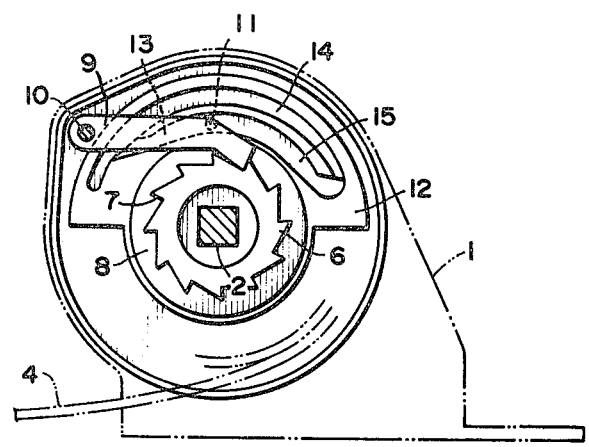
FIG. 2 is a cross-sectional view of the embodiment of FIG. 1 along the lines 2—2 of FIG. 1.

As shown in FIG. 2, on the inner surface of cam plate 12 at a location corresponding to pin 11 are provided a first guide cam 13, a second guide cam 14, and a third guide cam 15. The first end of first guide cam 13 is inserted over pin 11 projecting from pawl 9 when pawl 9 is in engagement with surface 7 of a tooth of ratchet gear 6. As cam plate 12 rotates about an angle of 45 degrees in the unwinding direction, first guide cam 13 causes pin 11 and pawl 9 to rotate away from the engaging surface 7 so as to cause pawl 9 to disengage from the surface 7. First end 14a of second guide cam 14 is coupled to the second end 13b of first guide cam 13. As cam plate 12 turns through an angle of 90 degrees in the winding up direction, second guide cam 14 guides pin 11 such that pawl 9 remains in the disengaged state. First end 15a of third guide cam 15 is coupled to the second end 14b of second guide cam 14 and the second end 15b of third guide cam 15 is coupled to the first end 13a of first guide cam 13. Accordingly, after cam plate 12 has rotated 45 degrees in the unwinding direction then 90 degrees in the winding direction if it again turns a few degrees in the unwinding direction, third guide cam 15 causes pin 11 to move such that pawl 9 moves toward surface 7 for engagement therewith.

Figure 3:
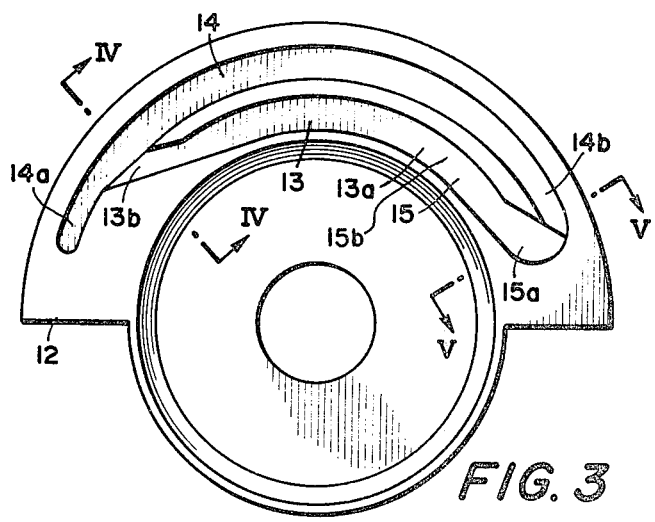
FIG. 3 is an enlarged inside view of the cam plate 12.
Figure 4:
FIG. 4 is a cross-sectional view of the cam plate of FIG. 3 along the lines 4—4.
Figure 5:
FIG. 5 is a cross-sectional view of the cam plate of FIG. 3 taken along the lines 5—5.

As shown in FIG. 3, each of the guide cams 13, 14 and 15 is in fact a groove. The second guide cam 14 forming an arc substantially concentric with the axial center of the take-up spool 12. The first end 14a of second cam guide 14 is formed slightly deeper than the second end 13b of first guide cam 13, as shown in FIG. 4. The first end 15a of third cam 15 is formed slightly deeper than the second end 14b of second cam 14, as shown in FIG. 5, so as to enable pin 11 to operate smoothly during the guiding function.

Figure 6:
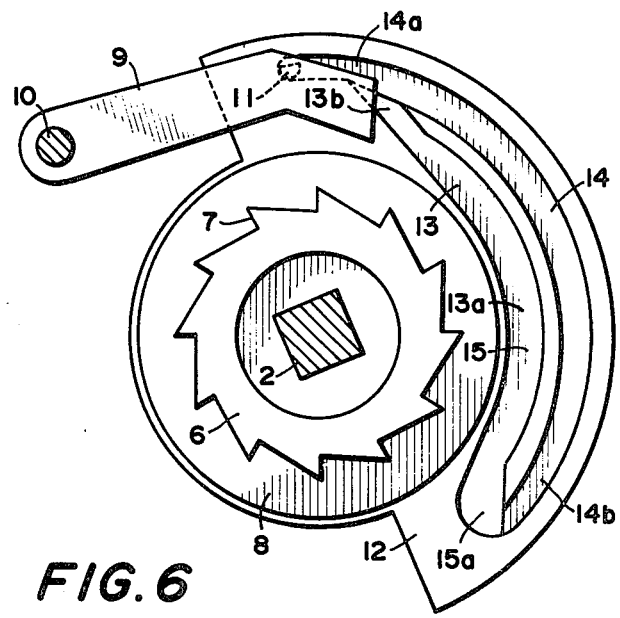
FIG. 6 is an inside view of the cam plate 12 and associated parts.

In operation, as the wearer pulls out the seatbelt 4, which is wound around take-up spool 2, take-up spool 2 together with ratchet gear 6 in cam plate 12 rotate clockwise in the unwinding direction as shown in FIG. 2. Then, as the belt continues to be pulled out of the seatbelt 4, first guide cam 13 rotates counter-clockwise in the unwinding direction to an angle as shown in FIG. 6 and the second end 13b of first guide cam 13 and the first end 14a of second guide cam 14 guides control pin 11 away from ratchet gear 6 so as to cause pawl 9 to disengage from the engaging surfaces 7. Cam plate 12 continues to rotate until pin 11 comes to the end of first end 14a of l second guide cam 14. Thereafter, as seatbelt 4 is continued to be pulled out, take-up spool 2 and ratchet gear 6 rotate in the same clockwise unwinding direction while cam plate 12 is rendered immovable due to the slippage between plate 12 and ratchet gear 6.

When the seatbelt is sufficiently pulled out and placed about the wearer's body and the buckle is coupled to the tongue, any surplus that has been pulled out is wound up on the spool 2 by the torque action of the spring 5. This causes take-up spool 2, ratchet gear 6 and cam plate 12 to rotate counterclockwise in the wind-up direction from the position shown in FIG. 6 to the position shown in FIG. 7, or in other words, from the first end 14a of second guide cam 14 to the first end 15a of a third guide cam 15, cam plate 12 is rendered unrotatable. If seatbelt 4 continues to wind up, cam plate 12 remains stationary due to slippage against ratchet gear 6.

Figure 7:
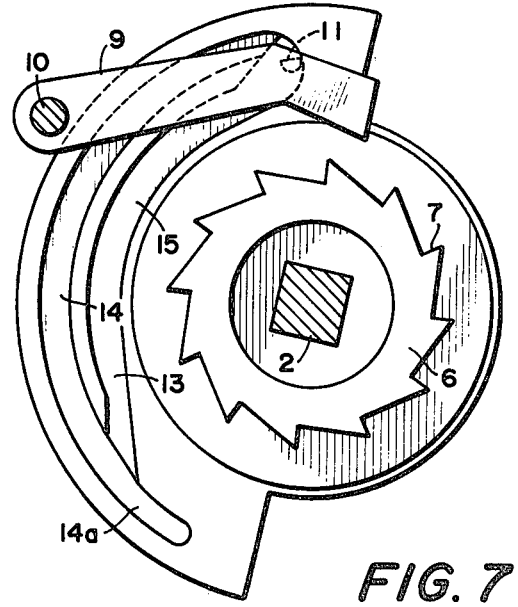
FIG. 7 is an inside view of the cam plate 12 and associated parts.

When the wearer adjusts the tension of seatbelt 4 by means such as, for example, expanding his stomach muscles, seatbelt 4 is pulled out slightly causing take-up spool 2, ratchet gear 6 and cam plate 12 to rotate clockwise in the unwinding direction from the position shown in FIG. 7. This causes control pin 11 to be led from first end 15a of third guide cam 15 to the first end 13a of first guide cam 13 thereby moving pawl 9 toward the direction of engagement with engaging surface 7 of ratchet gear 6. This motion continues until pawl 9 engages a desired engaging surface 7 of ratchet gear 6. In this state, even though the belt can be freely pulled out, the tension on the belt remains the same since take-up spool 2 is locked in the winding up direction.

As described hereinabove, the retractor of the present invention comprises a take-up spool provided with a torque to rotate in the winding up direction, a ratchet gear having engaging surfaces facing the winding direction, a rotatable cam plate which frictionally engages the ratchet gear and a pawl for engaging the ratchet gear thereby locking the take-up spool and rendering its rotation impossible. Accordingly, excessive tightness of the seatbelt after it has been placed on the wearer can be accurately prevented by an exceedingly simple mechanism. Moreover, no extra steps or actions are required on the part of the wearer other than merely buckling the seatbelt. Furthermore, it should be apparent to one skilled in the art that the above-described seatbelt retractor mechanism would also include a means for preventing the extension of the seatbelt during an accident. Such a means would include inertia type locking mechanisms for seatbelt retractors. Furthermore, it should be apparent that the frictional force which causes cam plate 12 to rotate need not be between the cam plate 12 and the ratchet gear 6 but could be supplied in a number of ways such as between the cam plate 12 and the hub on the ratchet gear 6.

In all cases, it is understood that the above-described embodiment is merely illustrative of but one of the many specific embodiments which represent the applications of the principles of the present invention. Furthermore, numerous and varied other arrangements can be readily devised in accordance with the principles of the present invention by those skilled in the art without departing from the spirit and scope of the invention.

I claim:

1. A seatbelt retractor comprising:

a frame;

a seatbelt pick-up spool rotatably coupled to said frame;

means for applying rotational torque to said spool in a winding-up direction;

a seatbelt wound on said spool;

at least one ratchet gear coupled to said spool;

a pawl pivotably coupled to said frame and engagable with said ratchet gear such that said spool is prevented from winding-up said seatbelt when said pawl engages with said ratchet gear;

a pin member provided on said pawl; and means for selectively disengaging and engaging said pawl from said ratchet gear whenever said seatbelt is in a predetermined position, said means for selectively disengaging and engaging said pawl comprising a cam plate frictionally coupled to said ratchet gear and rotatable therewith, said cam plate having:

a first guide cam formed in said cam plate for guiding said pawl to move in the direction of disengagement when the cam plate rotates in the unwinding direction of said belt;

a second guide cam for guiding said pawl formed in said cam plate and continuous with said first guide cam, said second guide cam holding said pawl in a disengaged position when said belt is wound in the winding-up direction; and a third guide cam for guiding said pawl formed in said cam plate continuous with said first and second guide cams, said third guide cam guiding said ratchet towards engagement with said ratchet gear;

said first, second and third guide cams comprising first, second and third grooves disposed on a surface of said cam plate adjacent said pawl and said pin member cooperates with said first, second and third grooves so as to selectively move said pawl.

2. A seatbelt retractor according to claim 1 wherein said means for applying a rotational torque comprises a coil spring.

3. A seatbelt retractor according to claim 1, wherein said second groove is deeper than said first groove at an end where said second groove meets said first groove and is shallower than said third groove at an end where said second groove meets said third groove whereby said pin is smoothly guided from said first groove to said second groove and from said second groove to said third groove as said cam plate rotates.

4. A seatbelt retractor according to claim 3, wherein said second groove is deeper than said first groove where said second groove meets said first groove.

5. A seatbelt retractor according to claim 4 wherein said third groove is deeper than said second groove where said third groove meets said second groove.

* * * * *